United States Patent [19]

Waite

[11] Patent Number: 5,271,071
[45] Date of Patent: Dec. 14, 1993

[54] DIGITAL NONALGORITHMIC METHOD OF COMPRESSING DATA WHICH REPRESENTS ADDRESSES AND VALUES

[75] Inventor: John H. Waite, Haddonfield, N.J.
[73] Assignee: INDS-OPs, Inc., Montville, N.J.
[21] Appl. No.: 718,766
[22] Filed: Jun. 21, 1991
[51] Int. Cl.$^5$ .......................... G06K 9/36; H04N 1/41
[52] U.S. Cl. .................................... 382/56; 358/426; 358/429; 358/432
[58] Field of Search .................. 382/56; 358/426, 429, 358/432, 433

[56] References Cited

U.S. PATENT DOCUMENTS

| | | |
|---|---|---|
| 4,652,935 | 3/1987 | Endoh et al. .......................... 358/260 |
| 5,038,390 | 8/1991 | Chandran .............................. 382/56 |
| 5,065,447 | 11/1991 | Barnsley et al. ...................... 382/56 |

Primary Examiner—David K. Moore
Assistant Examiner—Andrew W. Johns
Attorney, Agent, or Firm—John N. Bain; William Squire

[57] ABSTRACT

There is provided a digital, non-algorithmic method of compressing data. Data representing the addresses and values of pixels in an array are compressed. A first matrix is produced. The addresses of the first matrix are isomorphic with the range of possible pixel values, with one address corresponding to one pixel value. Same-valued pixels in the array are counted and each count is entered or tallied in the address of the first matrix corresponding to the value. One second matrix is generated for each pixel value actually present in the array. The addresses of the array and the second matrices are isomorphic. A binary "1" is placed in each address of each second matrix which corresponds to the address of the array having a pixel with the value to which the second matrix corresponds. The generated matrices represent very high data compression of 99% or higher. The first and second matrices may be transmitted, following which the array may be reconstructed therefrom. Because of the digital, non-algorithmic character of the foregoing, compression, transmission and decompression are essentially lossless and are conveniently subject to error correction. Residual mathematics is used to convert pixel values in the array to addresses in the first matrix and to convert the addresses of the transmitted first matrix to pixel values. Compression and decompression, including residual mathematical calculations may be effected by a general-purpose digital computer programmed in BASIC and/or by hardware which performs repetitive calculations.

11 Claims, 5 Drawing Sheets

DIGITAL NONALGORITHMIC METHOD OF COMPRESSING DATA WHICH REPRESENTS ADDRESSES AND VALUES

BACKGROUND—PRIOR ART

The present invention relates to a method of compressing data, and, more particularly to a method of compressing data representative of a video signal to achieve more facile transmission thereof.

Data compression or compaction techniques can increase the throughput of data over a communication link. A simple way to achieve data compression is to examine data intended to be moved over a communication link and to transmit an instruction which provides a count of characters that are repeated in sequence. This technique, called "run length encoding" permits transmission and reception of the instruction—without actually transmitting or receiving the serial characters—as a surrogate for the characters. Another technique, called "code book compression", uses specific codes to indicate a pattern of characters and phrases to permit one character to be sent and received as a surrogate for numerous other characters. Also known is so-called "Huffman encoding" pursuant to which tables indicating the frequency of use of characters within a language are evolved. The number of bits required to send each character is based on the character's relative frequency in the language.

A video image is usually expressed in pixels or pels. A pixel is a point (i.e., an address or location in an orthogonal (X, Y)) array having a value. The value is related to, or determines, color and/or intensity. Of interest is the compression of video data contained in the sixty-four, 64 by 64 arrays (4096 pixels/array), where each pixel may have one of 256 values ranging from 0 to 255.

A "standard" video screen has a theoretical grid of 520×640 pixels, of which only a 512×512 pixel grid typically is used. A 512×512 pixel grid may be viewed as containing 64 (i.e., 8×8) "BLOCKS", each BLOCK comprising a 64×64 array of pixels. The 512×512 pixel grid, or 8×8 grid of pixel BLOCKS, each being a 64×64 array of pixels, is called "FRAMEGRAB".

As noted, each pixel has an orthogonal location, representable in orthogonal X,Y notation, and a value, P. Thus, each pixel could be identified by the notation X,Y,P in which X is the decimal value of its X ordinate (horizontal row in the array), Y is the decimal value of its Y coordinate (vertical column in the array) and P is its decimal color/intensity value. Typically the pixel at the origin, (the upper left-hand corner) that is, the "first" pixel or pixel 0, has a decimal scalar address S of "0" (i.e., S=0) and is represented in X, Y or vector notation as X,Y=0,0. Since the standard FRAME-GRAB is 512×512, within a FRAMEGRAB X and Y vary from 0–511 (i.e., 0,0 to 511,511) and P varies from 0–255.

Alternatively, each pixel location can be identified by the decimal scalar quantity S identifying its grid location (there are 262,144 such locations in a 512×512 grid) varying from 0 to 262,143 and a decimal numeric designation P of each pixel's value (0–255). The X,Y vector and S (scalar) notations for a pixel's address are convertible one into the other. For example, considering the 512 pixel by 512 pixel grid, the pixel in decimal scalar location S=12,500 is located in location X,Y=24,212, that is, in the Row 24 and Column 212. This conversion may be easily achieved for in the typical orthogonal pixel array by so-called residual mathematics. Specifically, the scalar decimal location S=12,500 in the grid is representable by $$S = X(Mod) + Y,$$

where "Mod" means modulus and is the number of pixels, here 512, in a row or column. Thus, $$S = 12,500 = X(512) + Y,$$

where X is the largest multiple of 512 not exceeding 12,500 (=24) and Y is the remainder (=212). That is, $$S = 12,500 = (24)(512) + 212$$

where X=24 and Y=212

An example of one type of compression is now described. Assume that in the 512×512 pixel grid, a pixel at S=1300 (X,Y=2,276 in X,Y notation) has a value of 100, pixels at S=1301 through S=1315, (X,Y=2,277 through 2,291 in X,Y notation) all have the value of 150, and the pixel at S=1316 (X,Y=2,292) has a value of 200. In transmitting non-compressed data representing the foregoing, the location S=1300 (or X=2, Y=276) and P=100 are first transmitted. This is followed by transmission of X=2, Y=277, P=150 through X=2, Y=291, P=150, which is followed by transmission of X=2, Y=292, P=200. Transmission and receipt of these data nominally require that all data be sent and received, decimally, digitally or otherwise. However, compression may be achieved.

Specifically the value P=150 is the same for the pixels located X,Y=2,277 through X,Y=2,291. The value P=150 may, for the pixels located at X,Y=2,278 through X,Y=2,291 (having the scalar addresses S=1301 through S=1315) be transmitted as a "null" or "0", the presence of a "null" or "0" being a "code" which instructs that the affected pixel following X,Y=2,277 (scalar S=1301) has the same value as the value of the last non-0 pixel value, or, that pixels with scalar addresses from S=1302 (X,Y=2,278) through S=1314 (X,Y=2,290) have the same value P=150 as the pixel at scalar location S=1300 (X,Y=2,276). Thus, if the transmission notation is in the form "S,P", data regarding the foregoing pixels would be:

(a) Uncompressed (S,P): 1300,100; 1301,150; 1302,150 . . ., 1314,150; 1315,150; 1316,200;

(b) Compressed (S,P): 1300,100; 1301,150; 1302,0; 1303,0; . . . , 1314,0; 1315,0; 1316,200.

The presence of 0's in fourteen locations following "1301,150," denoting addresses having pixels with the same value P=150 as address 1301 instead of bits representing "150", decreases the amount of, or compresses, the data which needs to be transmitted. This is a type of "run length encoding" mentioned earlier, in which serial, repeating characters are not sent. This technique is also referred to as "filling in".

Although locations in any grid of pixels do not repeat—each location is unique—as do the pixel values, a variant of the above run length encoding as regards pixel locations can be used. An S having the value 0 in the S,P notation does not mean the "0" location, but is a "code" meaning "that the relevant location is "1" higher than the preceding location. Thus, the compression expressed as (b) above, can be further compressed as:

(c) 1300,100; 0,150; 0,0; 0,0 . . . 0,0; 0,0; 0,200.

The above compression techniques may lead to compressions of the pixel value data as high as 70% and compressions of the pixel location data as high as 50%. Unfortunately, where both value and location must be transmitted, the "real" compression is the lower of the two compressions. Further, because pixel values P may be essentially not repetitive, these techniques may yield as little as 2% compression of the data representing pixel value P, in which event the real compression is about 2%.

Accordingly, one object of the present invention is the provision of techniques for compressing pixel value and address data which achieve compressions significantly higher than the techniques of the prior art, specifically, compressions of at least about 80% and higher, such as compressions of 100:1, or even 1000:1.

As noted, data compression using run length encoding may achieve maximum compressions of only 50%, but often the compression is substantially less than this maximum. Compressions achieved by "code book compression" and "Huffman encoding" may reach 70–80%, but, in reality, typically reach 60% or lower. Further, compression achieved according to the so-called "cosine law" is capable of achieving apparently higher compressions of up to 99%, but often results in, or introduces, errors which, in turn, produce "fuzzy" pictures.

SUMMARY OF INVENTION

With the above and other objects in view, the present invention contemplates a method of compressing video data. Video data is represented by pixels, each of which has both a location or address in a two-dimensional grid (such as the face of a CRT or monitor) and a value (typically, representing color and/or light intensity) having a decimal range from 0 to 255. In one form of standard pixel grid, there are 262,144 pixels in a 512×512 grid. This grid can be viewed mathematically and/or topographically in several ways including: (1) as a 2 square by 2 square grid of 4 squares, each square being 256 pixels by 256 pixels (with 65,536 pixels/square); (2) as a 4 square by 4 square grid of 64 squares, each square being 128 pixels by 128 pixels (with 16,384 pixels/square); or (3) as an 8 square by 8 square grid of 64 squares, each square being 64 pixels by 64 pixels (with 4,096 pixels/square).

The 64 squares, in the 8 square by 8 square grid, each square being 64 pixels by 64 pixels, have been determined to be useful units, according to the present invention. Each 64 pixel by 64 pixel square is referred to herein as a BLOCK, with the 512 by 512 grid having 64 BLOCKS. For reasons explained below, the present invention relies on and utilizes isomorphism and its related properties and more particularly isomorphism between the value range (0–255) of the pixels in an array and the number of pixel addresses in a BLOCK array. For this reason, the BLOCK is an especially interesting unit.

Specifically, each BLOCK, as noted, contains 4096 pixels in a 64 pixel by 64 pixel grid. Each BLOCK can be viewed as a 4 by 4 grid of arrays, each array being 16 pixels by 16 pixels (with 256 pixels/array). The addresses (0–255) of 16 pixel by 16 pixel arrays, which are referred to herein as "SUB-BLOCKS," are isomorphic with the pixel value range (0–255). That is there are 256 pixels in each SUB-BLOCK and each pixel in each SUB-BLOCK has 256 possible values. Accordingly, and viewing the first pixel value and the first address as "0", the decimal scalar location or address of each pixel in a SUB-BLOCK is within the range 0–255, as is the decimal value of each pixel. Thus, the possible decimal, scalar location or address of each pixel in each SUB-BLOCK is isomorphic with the possible value which such pixel can assume, that is, the locations and the values both decimally range from 0–255.

Thus, each BLOCK contains 16 SUB-BLOCKS in a 4 SUB-BLOCK by 4 SUB-BLOCK arrangement or grid. For reasons related to the ultimate goals of manipulation, transformation and compression, the SUB-BLOCKS of each BLOCK can be mathematically viewed as being located in a three-dimensional array or "stack" or "pile" of 16 SUB-BLOCKS. In other words, one can devise a three-dimensional construct, and any pixel in a BLOCK can be identified as to location in the stack in "X,Y,Z" or vector notation. In this vector notation, "X" represents a selected SUB-BLOCK's location in the stack (with the first being 0, the second 1, etc.), "Y" represents the pixel's row in the selected SUB-BLOCK (with the first being 0, etc.), and "Z" represents the pixel's column in the located SUB-BLOCK. With each pixel being located somewhere in one of the 16 pixel by 16 pixel SUB-BLOCKS, and with the stack of 16 SUB-BLOCKS constituting a BLOCK, the possible locations of the pixels in a selected SUB-BLOCK—expressed in scalar, decimal notation—are isomorphic with the possible values of the pixel. The 4096 pixel locations in a BLOCK, therefore, range from X,Y,Z=0,0,0—the address of the first pixel ("origin") in the first SUB-BLOCK—to X,Y,Z=15,15,15—the address of the last pixel in the last SUB-BLOCK. Further, as noted, the decimally expressed scalar locations or addresses of each pixel in a SUB-BLOCK are isomorphic with the decimally expressed range of pixel values: both are 0–255. In the X,Y,Z notation, X designates a specific SUB-BLOCK, and Y,Z designates a location or address in such SUB-BLOCK.

As an example of the foregoing, consider pixel 2238 in a BLOCK, where 2238 is the decimal, scalar address or location of the pixel. Recalling the construct of "converting" the BLOCK to 16 SUB-BLOCKS, a convention is used in which SUB-BLOCK 0 is at the upper left of the BLOCK, SUB-BLOCK 1 is immediately to the right of SUB-BLOCK 0, etc., until SUB-BLOCK 15 at the lower right of the BLOCK is reached. Further, according to the convention, pixel 0 in any SUB-BLOCK is at the upper left thereof and pixel 255 is at the lower right, with pixel 15 being at the end of row 0 which begins with pixel 0, and with row 1 starting with pixel 16 and ending with pixel 31. Additionally, according to the convention, column 0 contains pixel 0 and then pixel 16 down through pixel 240. Thus, pixel 2238 is located in SUB-BLOCK 8, in Row 11 and Column 14.

The location or address, in Y,Z or vector format, of a pixel in a given SUB-BLOCK may be conveniently calculated using so-called residual notation. In residual notation, a decimal number may be expressed as $$(K)*(modulus)+L,$$

Where K is the highest whole number by which the modulus M can be multiplied without exceeding the decimal number and L is the remainder resulting from subtracting (K) * (M) from the decimal number. Thus, the decimal number 190 is represented residually as K, L=11, 14 if the modulus is 16. In the case of the location or address of any of the 256 pixels (0–255) in a 16 pixel by 16 pixel SUB-BLOCK, the modulus is 16, the number of pixels along any side of the SUB-BLOCK. Thus, the location of any such pixel in a SUB-BLOCK can be expressed as $$(K)*16+L.$$

Assume that a pixel of interest is pixel 190 in one SUB-BLOCK. Thus:

$$190=(K)*16+L, \text{ or}$$

$$190=(11)*16+14.$$

This result is achieved by performing 190÷16, with the whole number answer being K, and the remainder being L. In residual notation, pixel 190 is represented by K, L=11, 14 (i.e., Y,Z=11,14). Of further interest, if the pixel in the SUB-BLOCK of interest is denoted orthogonally in Y,Z notation the orthogonal location Y,Z of pixel 190 is 11, 14, which is the same as its residual expression K,L=11,14. That is, expressing a pixel's location in K, L residual notation with a modulus of 16 is the same as its orthogonal location Y,Z in the 16 pixel by 16 pixel SUB-BLOCK Similarly, if the vector location of a pixel in a SUB-BLOCK is known, the scalar, decimal location can be calculated. Specifically, a pixel in a SUB-BLOCK having a vector location Y, Z=11,14 is located at a scalar address given by (16)*(11)+14=190.

More generally, the residual expression for the vector location of a pixel in a 16 pixel by 16 pixel SUB-BLOCK can be expressed as $$(K)*16^1+(L)*16^\circ,$$

Also, viewing the locations of the pixel the stack of 16 SUB-BLOCKS, each being 16 pixels by 16 pixels and ranging from 0 to 4095, the residual expression for the vector location of a pixel in a given SUB-BLOCK of a BLOCK can be expressed as $$(M)*16^2+(K)*16^1+(L)*16^\circ$$

Considering again pixel 2238 in a BLOCK, the vector address X,Y,Z thereof (X,Y,Z=M,K,L) is given by first dividing 2238 by $16^2$=256. This division yields 8 and a remainder of 190. Next 190 is divided by $16^1$=16, yielding 11 and a remainder of 14. Thus, M=8, K=11 and L=14. Accordingly, the pixel at scalar address 2238 has a vector address X,Y,Z=M,K,L=8,11,14, meaning that pixel 2238 is in row 11, column 14 of SUB-BLOCK 8, or, stated differently, is pixel 190 on SUB-BLOCK 8. Of course, the reverse is true: the pixel having a vector address of 8,11, 14 has a scaler address given by (8)*($16^2$)+(11)*($16^1$)+(14)*($16^\circ$)=2238.

The beforegoing conventions and notation in mind, the present invention, in its broadest form, is a method of compressing data preparatory to transmitting the data. The data represents the addresses and the values of pixels in an array of pixels. The scalar form of each address and the magnitude of each pixel value is expressable as a decimal number. As a first step of the method there is generated a first matrix. The addresses of the first matrix are decimal numbers having a range which corresponds to the range of possible decimal pixel values. Each address in the matrix corresponds to one pixel value. The total number of same-valued pixels in the array are counted. For any possible pixel value which does not occur in the array there is no count (the count is zero). The totals of same-valued pixels determined in the counting step are entered in a location of the first matrix. This location has a decimal address equal to the decimal pixel value. The totals recorded in each address of the first matrix are then converted to a binary number.

Next, there are generated a plurality of second matrices. Each second matrix has addresses which respectively coincide with the pixel addresses in the array. There is one second matrix correlated to each pixel value which is represented as an address in the first matrix. A binary "1" is written in each address in each second matrix when the pixel located at the coinciding address in the array has a value equal to that to which the second matrix is correlated. All other addresses of the second matrices contain binary "0".

Subsequently the first matrix is transmitted and the second matrices are transmitted. Each second matrix is linked to the address of the first matrix which equals the pixel value to which the second matrix is correlated. The above technique leads to compression of the data representing the addresses (in scalar form) and/or the value of pixels in the array of approximately 99% or more.

In preferred embodiments the number of the addresses in the array and the number of addresses in the first and second matrices are isomorphic with each other and with the range of pixel values. Further it is preferred that the array and the first matrix are square. In specific preferred embodiments, because standard pixels range in value from 0–255, the array is a 16 by 16 array of pixels containing 256 pixels having scalar addresses of 0–255. This 16 pixel by 16 pixel array is a SUB-BLOCK, 16 of which SUB-BLOCKS constitute a BLOCK. A standard video presentation or "frame grab" contains 64 such BLOCKS in an 8 by 8 grid.

In other preferred embodiments converting pixel values to addresses in the first matrix is achieved by converting the scalar decimal representation thereof to a vector notation utilizing residual arithmetic. Thus when a pixel is encountered having a value P, that value P is converted to a vector address by first dividing the scalar address by a modulus M. The modulus is equal to the number of pixels on any side of the array and in specific embodiments hereof is 16. The pixel value P is divided by the modulus M so that an answer yielding a whole number and a remainder is given. The whole number is the row of the first matrix and the remainder is the column of the first matrix in which each pixel value P is recorded. Each time a pixel having the value P is encountered the number in the value-determined first matrix address is increased by 1 so that ultimately the decimal number recorded in the first matrix addresses is the total of pixels having the value represented by the address.

The data in each BLOCK of the framegrab is compressed in the above fashion.

DETAILED DESCRIPTION

Figure 1:
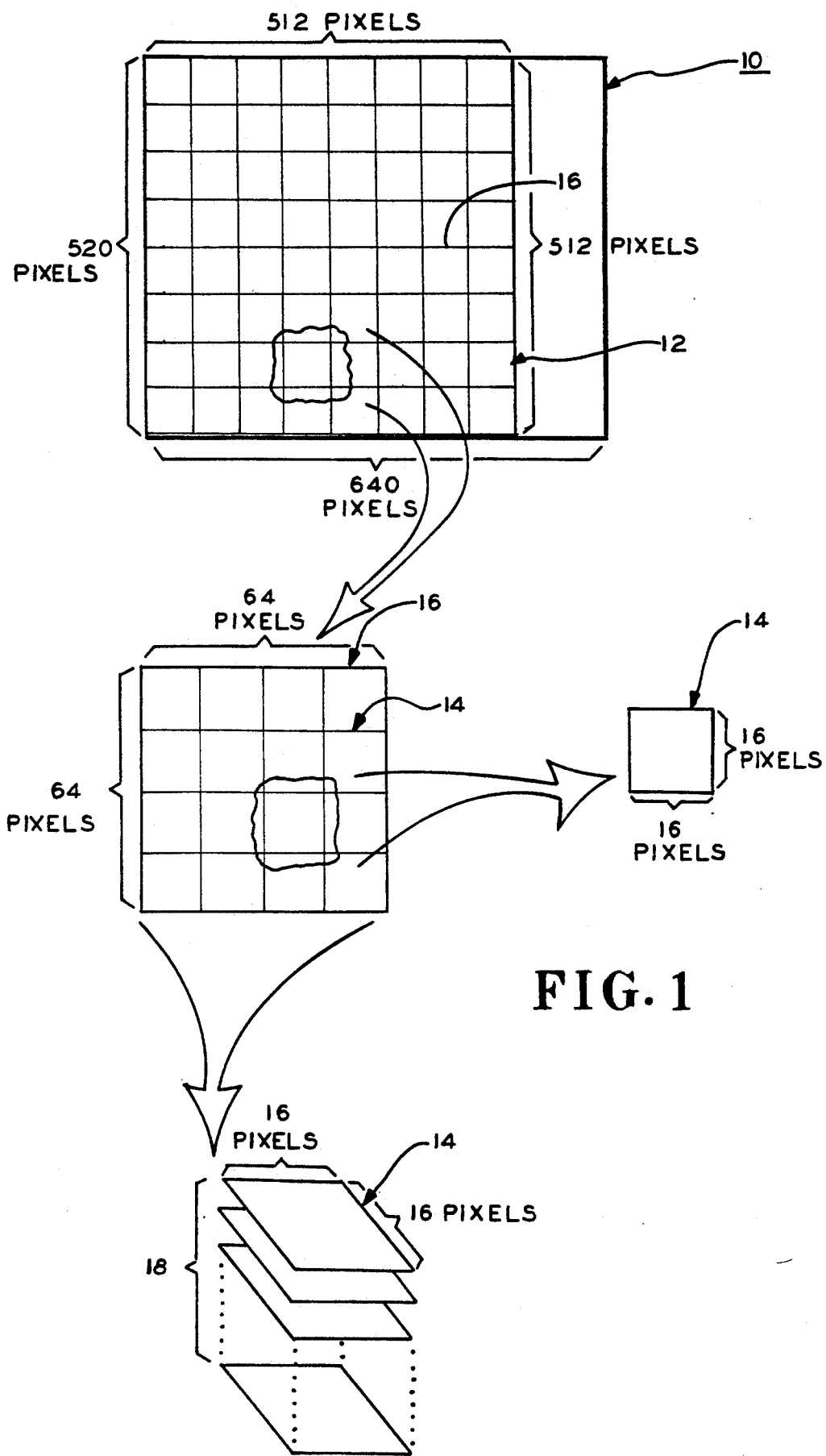
FIG. 1 is a schematic representation of a standard video screen having a theoretical 520×640 pixel grid and a usable 512 pixel×512 pixel grid or FRAMEGRAB, such Figure illustrating the 64 BLOCKS making up the FRAMEGRAB, each BLOCK comprising 64 pixels×64 pixels, the Figure further illustrating a BLOCK having a 4×4 array of 16 SUB-BLOCKS, each SUB-BLOCK comprising an array of 16 pixels×16 pixels, the Figure lastly illustrating a mathematical construct of a stack of the 16 SUB-BLOCKS making up a BLOCK.

As discussed previously, and referring to FIG. 1 a standard video screen 10 has a theoretical grid of 520 by 640 pixels. Typically only a 512 by 512 pixel grid 12 or framegrab is utilized. This grid 12 contains 262,144 pixels. Assuming that transmission of the data representing the value and location of these pixels is achieved in binary fashion, to transmit data concerning each pixel, 17 binary digits would be required to indicate the address of each pixel (0–262143) and an additional seven binary digits would be required to transmit information concerning the value of the pixel (0–255). Even if the 512 by 512 pixel grid or FRAMEGRAB is broken up into smaller arrays such as SUB-BLOCKS 14 each having 256 pixels, seven binary digits would be required to transmit the address of each pixel in a SUB.-BLOCK 14 and seven binary digits would be required to transmit information concerning the value of each pixel. The low throughput represented by the need to transmit a high number of binary digits has resulted in various data compression or compaction techniques such as "run length and encoding", "Huffman encoding", and "code book compression" in order to reduce the number of digits required to be transmitted. Again as noted earlier these prior coding and encoding techniques have resulted in maximum published compressions of about 70%. This invention differs in that uses both address and pixel compression components, which as far as available, information uses only pixel components.

The grid 12 contains 64 BLOCKS 16. Each BLOCK 16 contains 4096 pixels and, as a construct, 16 SUB-BLOCKS 14, each SUB-BLOCK containing 256 pixels. The SUB-BLOCK 14 have addresses from 0 to 255 and the SUB-BLOCKS 14 of a BLOCK 16 may be viewed as residing in a stack 18 having 16 SUB-BLOCKS 14.

As alluded to above, the present invention relies heavily on isomorphism between the number of addresses in a transmitted matrix, here a SUB-BLOCK 14, and the range of possible values which may be possessed by pixels in a standard video display 10. Pixels may have a value which ranges from 0–255. As already described the addresses in a 16 pixel by 16 pixel SUB-BLOCK 14 also range from 0–255. Thus the number of addresses in the SUB-BLOCK 14 as defined herein is isomorphic with the possible values that the pixels in the 16 pixel by 16 pixel SUB-BLOCK 14 of pixels may have. This isomorphism is used to advantage in the following manner.

Figure 5:
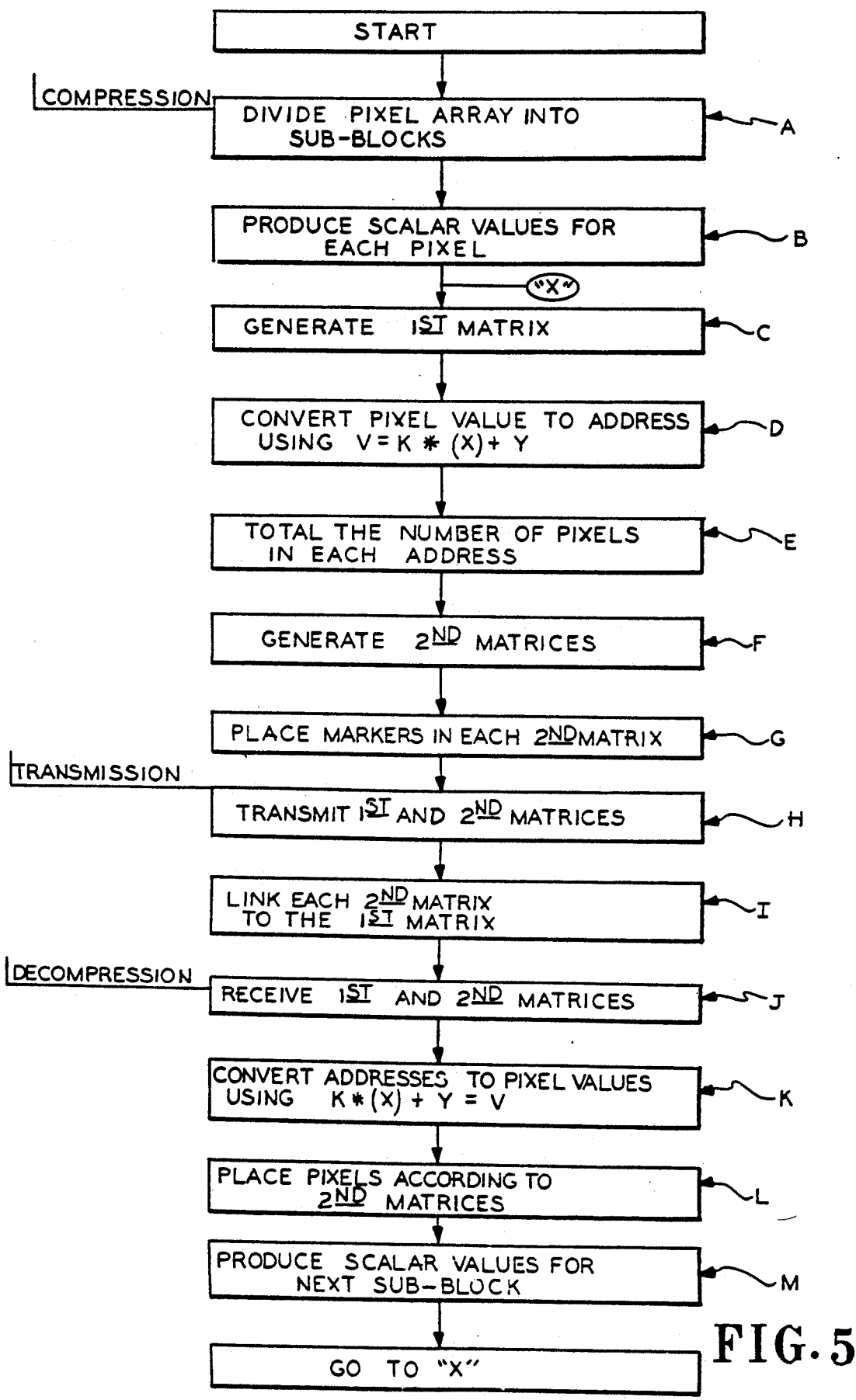
FIG. 5 is a flow chart generally illustrating the method of the present invention.

As illustrated in the flow chart of FIG. 5 by the reference character "A", the pixel addresses 22 in the SUB-BLOCK 14 and their values are isomorphic, a standard frame grab is broken up into a plurality of BLOCKS 16 there being 64 BLOCKS 16 in a standard 512 pixel by 512 pixel frame grab 12. Each BLOCK 16 in turn is made up of 16 SUB-BLOCKS 14, each of which constitutes a 16 pixel by 16 pixel array. Because the range of addresses 22 within each SUB-BLOCK 14 matches, or is isomorphic with, the range of value each pixel 22 may have, a transformation may be carried out which ultimately drastically reduces the number of digits which must be transmitted.

Figure 2:
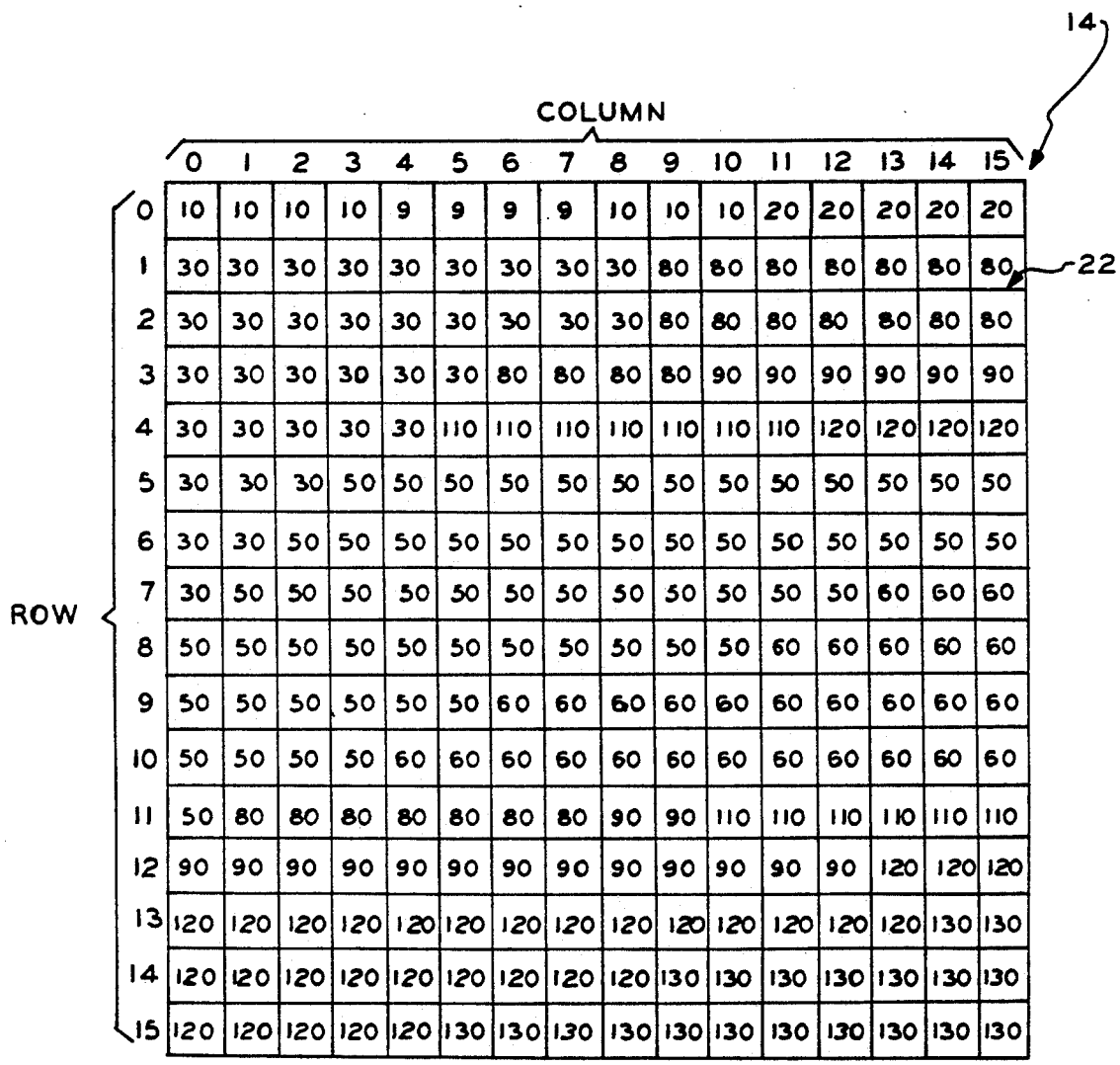
FIG. 2 is a schematic representation of one of the SUB-BLOCKS present in a BLOCK of the FRAMEGRAB of FIG. 1 which illustrates the addresses and the values of the 256 pixels thereof.
Figure 3:
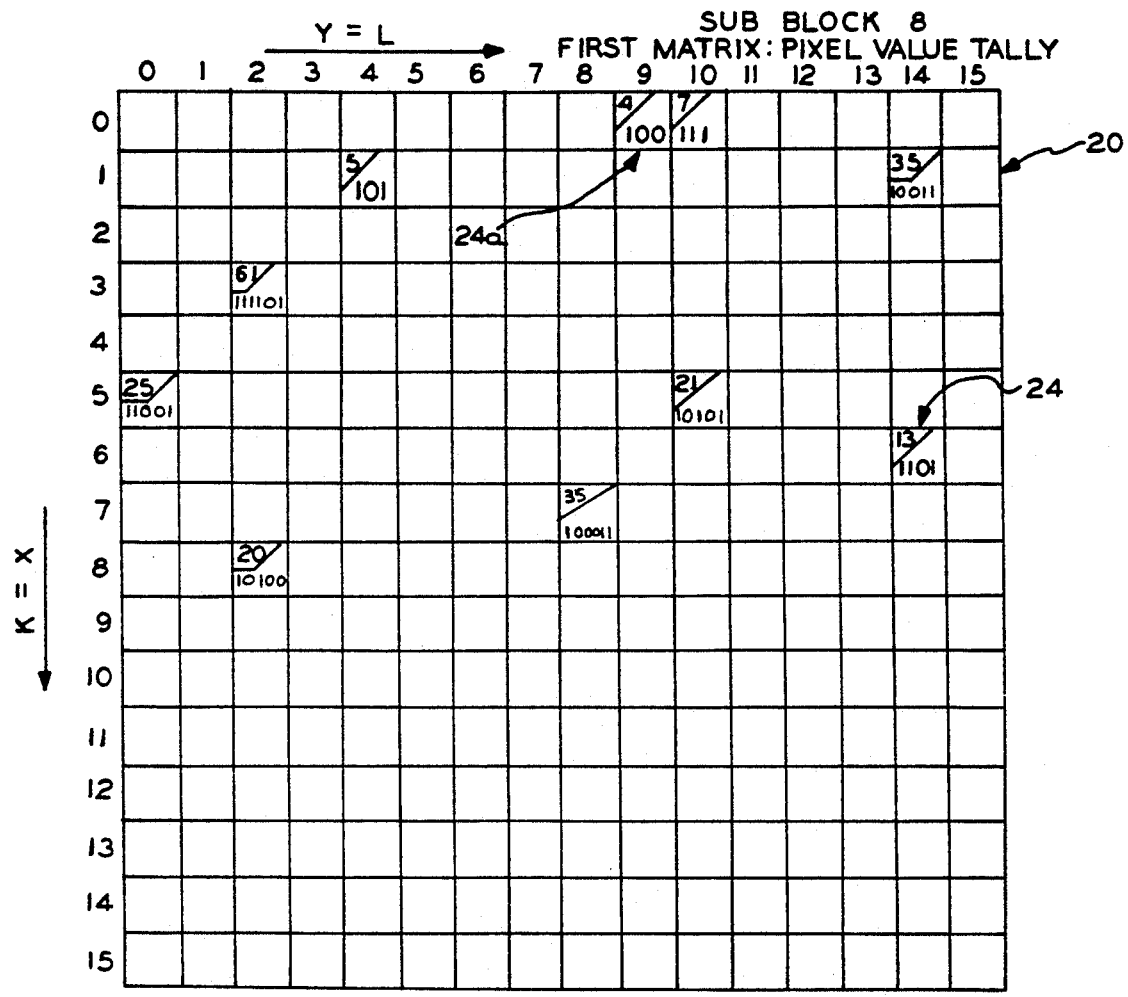
FIG. 3 is a schematic representation of a first generated matrix into which there have been assimilated the pixel value data of the SUB-BLOCK of FIG. 2 as denoted by the decimal/binary notation depicted, such assimilation having been achieved according to the novel method of the present invention and representing a pixel value tally.

Referring to FIGS. 2 and 3, each pixel 22 in a SUB-BLOCK 14 (FIG. 2) is examined and its decimal, scalar value is determined. See reference character "B" in FIG. 5. The decimal or scalar value of each pixel is converted, using the above described residual mathematic techniques as shown by the reference character "D" in FIG. 5, to an address 24 in a first matrix 20 (FIG. 3) which is constructed or generated (see reference character "C" in FIG. 5) in order to aid in transmission. Thus, as in a previous example, if a pixel 22 were to be found to have a value of 190, that number would be residually expressed as an address 24 of the first matrix 20 in which K,L=X,Y=11,14 or row 11, column 14. As indicated by the reference character "E" in FIG. 5, all other pixels 22 found in the SUB-BLOCK 14 which have the value 190 would also be tallied in the address 11,14 so that after all pixels 22 in the SUB-BLOCK 14 had been examined, the total thereof having the value 190 would represented by a decimal number in location 11,14. Note that because of the above described isomorphism, each possible value of the pixels 22 within the SUB-BLOCK 14 is represented by one and only one address 24 in the first matrix 20.

Still referring to FIG. 2, there is shown an exemplar of a SUB-BLOCK 14, the pixels 22 of which have the values illustrated (reference characters "A" and "B" in FIG. 5). Referring to FIG. 3, a first matrix 20 is shown (reference character "C" in FIG. 5) in which there are tallied in addresses 24 corresponding to the values of the pixels 22 (reference characters "D" and "E" in FIG. 5) the total number of same-valued pixels 22. For example, referring to the table at the lower part FIG. 3, and also referring to FIG. 2, 4 pixels 22 in the SUB-BLOCK 14 have a value of 9. The vector address 24a corresponding to the value 9 is calculated from $$9 = K*(16) + L,$$

where K,L=0,9. Thus, in the address 24a represented by K,L=0,9 of the first matrix 20 there is placed a 4 meaning that 4 pixels 22 in the SUB-BLOCK 14 have the value 9. This procedure is followed for all pixel values in the SUB-BLOCK 14, as shown in FIG. 3.

After examining each pixel 22 in the SUB-BLOCK 14, of FIG. 2 the address 24 of the first matrix 20 contains each total number of pixels 22 having the same value, with such same value being represented at a unique address 24 (which is the same as the value) in the first matrix 20. Transmission of the first matrix 20 represents a very high compression of data. Specifically in the original SUB-BLOCK 14 of FIG. 2 transmission of data representative of each pixel 22 would have required transmission of eight binary digits for the value of each pixel (ranging from 00000000, for a value of 0, to 11111111, for a value of 255) and transmission of eight binary digits representing the address of each pixel ranging from 00000000 for the address 0,0 to 11111111 for the address 15. Thus to merely transmit the value of each pixel in the SUB-BLOCK would have required the transmission of 2,048 binary digits (256 pixels × 8 binary digits can be seen, transmission of the first matrix (represented by the reference character "H" in FIG. 5) 20 of FIG. 3 requires transmission of only the actual binary numbers representing the actual decimal tally of pixels 22 having the value represented by their address 24 in the first matrix 20. In other words if four pixels 22 in the SUB-BLOCK 14 have the value 9, the decimal number 4 will ultimately be written in address 9 (that is, the pixel at addresses 0,4 through 0,7 in FIG. 2) of the first matrix 20 in row 0 column 9, or in address 0,9. When the first matrix 20 is transmitted, only the binary representation of the decimal number 4 ("100") is required to be sent. Because the binary number 100 is transmitted as residing in address 9 of the first matrix 20, the information is communicated that there are 4 pixels 22 in the SUB-BLOCK 14 having the value 9. Similarly, address 10 (K,L=X,Y=0,10) in the first matrix 20 contains a "7" (binary 111), because there are seven pixels 22 in the SUB-BLOCK 14 having the value 10; address 20 (K,L=X,Y=1,4) in the first matrix 20 contains a "5" (binary 101), because there are five pixels 22 in the SUB-BLOCK 14 having the value 20; etc. FIG. 3 illustrates completing the first matrix 20 for the SUB-BLOCK 14 of FIG. 2. Addresses in the first matrix 20, such as: 0,6 (scalar 6); 8,7 (scalar 135); and 12,10 (scalar 202), which do not correspond to a pixel value in the SUB-BLOCK 14 remain "blank" or contain a "0" or a null, as shown in FIG. 3. After completing the first matrix 20 and transmitting it, all that need be done is to transmit information which indicate addresses in a decompressed SUB-BLOCK contain the pixels having the values 9,10,20, etc.

Figure 4:
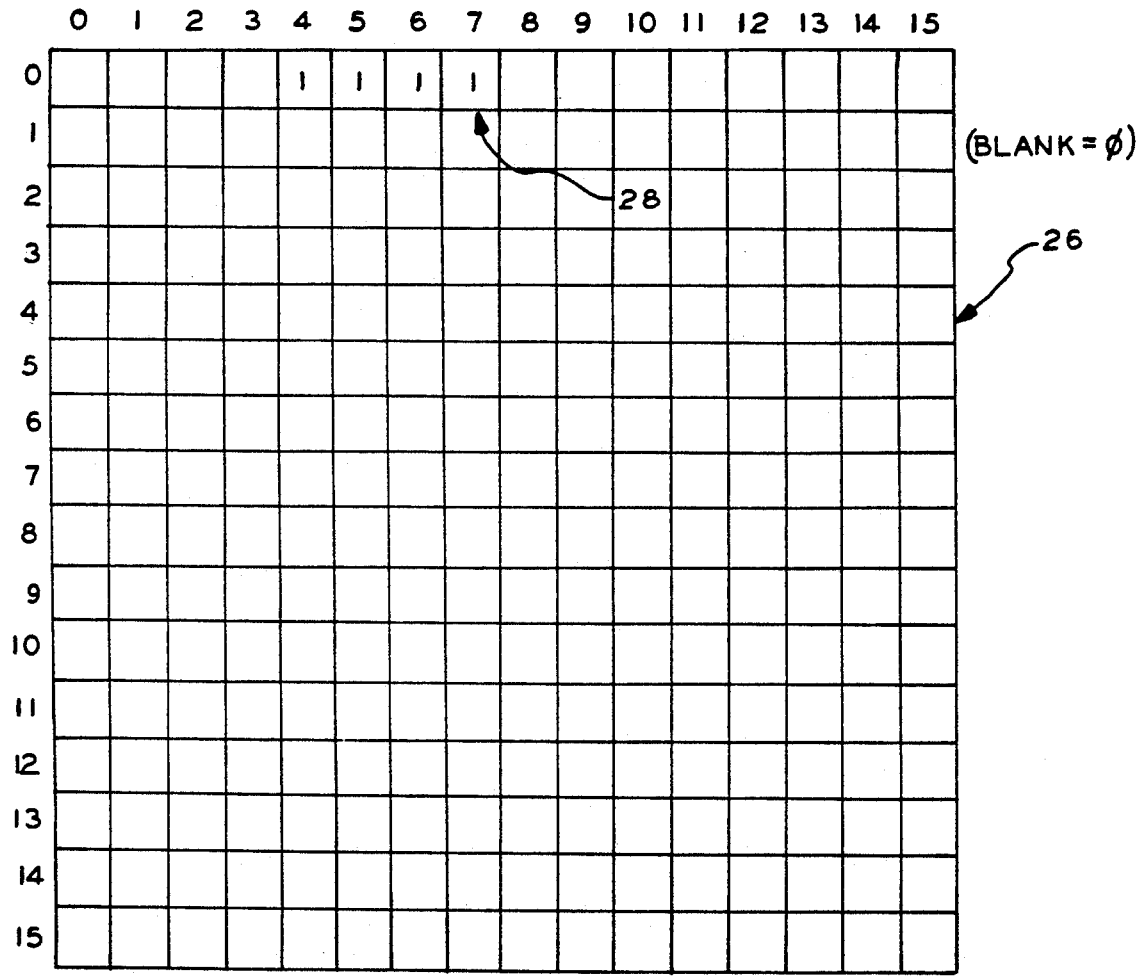
FIG. 4 is a schematic representation of a second matrix into which there has been assimilated the addresses for one value of same-valued pixels in the SUB-BLOCK of FIG. 2.

To permit decompression of the data representing the original SUB-BLOCK 14, and as represented by the reference character "F" in FIG. 5, there are also generated and transmitted second or address matrices 26, only of which is shown in FIG. 4. The address matrices 26 are congruent with the SUB-BLOCK 14 and contain matching addresses 28 on a one-for-one basis therewith. One address matrix 26 is produced for each pixel value which is represented in the SUB-BLOCK 14 and has an address in the first matrix 20. Thus in the above example, for the four pixels having the value of 9, an address matrix 26 is produced which is correlated with the value 9 and with the address 9 in the first matrix 20. As illustrated by the reference character "G" in FIG. 5, in the "9" address matrix 26 each address 28 which corresponds to an address 22 in the SUB-BLOCK 14 having a pixel with the value 9 receives a binary "1". All other addresses of the 9 address matrix 26 are contain a binary "0". A second matrix 26 is similarly produced for all other pixel values 10,20, etc. in the SUB-BLOCK 14, as indicated at reference characters "F" and "G" in FIG. 5. When the first matrix 20 and the second matrices 26 are transmitted, the second matrices 26 are linked to or correlated with (see reference character "H" in FIG. 5) the addresses 24 in the first matrix 20 which are, in turn, derived from the pixel values in the SUB-BLOCK 14. Accordingly, the original SUB-BLOCK 14 may be reconstructed in the above example by placing one pixel having the value 9 (as shown by the address 9 in the first matrix 20) in each address 22 of the reconstructed SUB-BLOCK 14 corresponding to an address 28 in the "9" address matrix 26 which contains a binary "1". Other pixel values are similarly located in the reconstructed SUB-BLOCK 14.

As an example of decompression, the presence of a tally of 4 (binary 100) at address 0,9 of the received first matrix 20, instructs that four pixels of the SUB-BLOCK 14 have a value given by $$Value = 0*(16) + 9 = 9,$$

the reverse of the residual mathematical calculation which led to deriving the address 0,9 in the first matrix 20 from the value 9 of the four pixels 22 in the SUB-BLOCK 14. This reversal is illustrated by the reference character "K" in FIG. 5. Similarly, the tally 35 (binary 100011) at address 7,8 of the first matrix 20, means that thirty-five pixels of the SUB-BLOCK 14 have a value given by $$Value = 7*(16) + 8 = 112 + 8 = 120.$$

Returning to the four pixels 22 having a value of 9, and as illustrated by the reference character "L" in FIG. 5, matrix 26 controls the placement in the reconstructed SUB-BLOCK 14 of pixels with a value of 9 at addresses 0,4 through 0,7, because the addresses of the second matrix 26 each contain a "1."

The above compression technique has been found to result in compressions in excess of 99%. This finding was demonstrated by exhibiting compressions of a variety of standard test patterns used in the industry to analyze the transmission of video data.

Specifically, the foregoing technique may be practiced on a standard, general-purpose, digital computer running a standard version of BASIC (or GWBASIC or BASICA). BASIC permits the creation of the first and second matrices 20 and 26 and, to that end, also includes the capability of being programmed to being programmed to perform residual mathematics and other manipulations, such as converting the decimal tallies recorded in the first matrix 20 to binary format. Programming in BASIC permits the conversion of a pixel value, say, the value 50 at address 8,8 (scalar 136) in the SUB-BLOCK 14, to an address of the form $$50 = K*(16) + L$$

$$50 = 3*(16) + 2$$

$$K,L = X,Y = 3,2$$

so that for the pixel value of 50 at the address 8,8 in the SUB-BLOCK 14, a "1" is tallied at the address 3,2 in the first matrix 20. Since there are 61 pixels 22 having a value of 50 in the SUB-BLOCK 14, the address 3,2 in the first matrix 20 ultimately has a tally of 61 (111101 in binary). The value of the pixels 22 may be obtained by an standard video scanning and/or encoding methodology, including the use of an image digitizer and may be performed off-line or in real time. Since the residual mathematical calculations during compression and decompression are similar or repetitive, they may be performed by special purpose hardware rather than a software-implemented general-purpose computer as is well known. After the matrices 20 and 26 have been generated as described above, they may be transmitted in real time, for example, via a radio or telecommunication system, or off-line, for example, by tape or diskette, to a receiving point where decompression takes place.

As noted, in the construct of FIG. 1, each SUB-BLOCK 14 is actually one of sixteen SUB-BLOCKS 14 constituting an entire BLOCK 16. Also, each BLOCK 16 may be represented by a mathematical construct as a sixteen high stack 18 of SUB-BLOCKS 14. Further, as discussed earlier, not only may each address 22 in each SUB-BLOCK 14 be represented as K,L (or X,Y) in residual notation, but also the pixels 22 in the BLOCK 16 may be represented by a three-dimensional vector or residual notation having three digits (Z,X,Y or M,K,L) in which the first digit identifies a particular SUB-BLOCK 16 in the stack 18 and the second and third digits represent the row 21 Column of a pixel 22 in the SUB-BLOCK 16.

The above compression technique may be used to compress the data in a BLOCK 16. In this event the first matrix 20 will contain in its addresses a tally or count of the number of pixels 22 in all of the sixteen SUB-BLOCKS 14 of the BLOCK 16 which have the same value; again, the value of a pixel 22 determines the address 24 of the first matrix 20 in which the tally or count is kept. When dealing with only a SUB-BLOCK 14, the count or tally in any address 24 in the first matrix 20 does not exceed 256—since a SUB-BLOCK 14 has only 256 addresses. When compressing the data in a BLOCK 16, the count or tally of same-valued pixels 22 represented in the addresses 24 of the first matrix 20 may exceed 256, and may theoretically be a maximum of $256 \times 16 = 4096$.

When compressing data of a BLOCK 16 there are involved some additional steps related to the second or address matrices 26. Specifically, a second or address matrix 26 must be correlated or linked to each address 24 of the first matrix 20 in which there is counted or tallied one or more pixel values 22, and a set of second or address matrices 26 must be produced for each of the sixteen SUB-BLOCKS 14 in the BLOCK 16 having one or more pixels 22 having such value. Thus, continuing the refer to the earlier example, if ten pixels 22 in the sixteen SUB-BLOCKS 14 of a BLOCK 16 have the value 9, with four of such pixels 22 being located on the fourth SUB-BLOCK (assuming that to be the SUB-BLOCK in FIG. 2) and six of such pixels 22 being located on the ninth SUB-BLOCK, there would be generated two second matrices 26 correlated or linked with the value 9. One of the second matrices 26 would be correlated with the value 9 in the fourth SUB-BLOCK (the second matrix 26 containing binary "1's" in addresses 0,4; 0,5; 0,6; and 0,7; as shown in FIG. 4) and the other second matrix 26 would be correlated with the value 9 in the ninth SUB-BLOCK (this second matrix 26 containing binary "1's" in the addresses corresponding to those addresses in the ninth SUB-BLOCK having pixels 22 with the value 9).

The counting or tallying of same-valued pixels 22 and the inclusion of these counts or tallies in those addresses 24 of the first matrix 20 which correspond to the value may be carried out by known hardware or a software-implemented general purpose computer. Since the calculation for putting the value P of each pixel 22 involves repetitive use of the algorithm $$P = K(16) + L,$$

it is assumed that special purpose hardware may perform the repetitive calculations more efficiently and quickly than a software program. However, whichever expedient—hardware or software—is used, compression requires that P be divided by 16, with K being the whole number result and L the remainder (K and L then represent the Row and Column, respectively, of the first matrix 20. Counters of known design may record the count or tally for each address 24 of the first matrix 20) and decompression requires that K in the first matrix 20 be multiplied by 16 and that L be thereafter added thereto.

As noted, a single first matrix 20 may be used to record the count or tally of same-valued pixels in a FRAMEGRAB 12 of any size. The maximum number of same-valued pixels 22 which are recordable in each address 24 may be as large as desired, and, therefore the FRAMEGRAB 12 may theoretically be as large (or small) as desired. The recordation of tallies in the first matrix 20 represents high compression, leading to efficient transmission of the data representing the values of the pixels 22 in the frame 10.

Correlating or linking the address matrices 26 to their corresponding pixel values may be achieved in any number of ways. For example, creation of the first matrix 20 not only gives a tally of same-valued pixels 22, it also, if serially scanned from address 0,0 to address 15,15, "sorts" the pixel values from lowest (P=9 in FIGS. 2 and 3) to highest (P=130 in FIGS. 2 and 3). Thus, if transmission of the pixel value tallies is carried out serially (9,10,20 . . . 120 and 130), it is a simple matter to accompany each pixel value tally transmission with the address matrix 26 corresponding to that value. Since only the "1's" of the address matrix 26 are actually transmitted, additional compression is achieved. In the case of the four pixels 22 having the value 9, seven digits, three binary digits (100) representing the tally of 4, and four binary "1's" representing the location of the four 9-valued pixels 22, are transmitted. Ordinarily, 64 digits, 8 for each address and 8 for each value, would have to be transmitted.

I claim:

1. A method of compressing data preparatory to transmission thereof, the data representing the addresses and the value of pixels in an array of pixels, the scaler form of each address and the magnitude of each value being expressed as a decimal number, the method comprising the steps of:

(a) generating a first matrix the addresses of which are decimal numbers having a range which corresponds to the range of possible decimal pixel values, each address in the first matrix corresponding to one pixel value;

(b) counting, for each pixel value represented in the array, the total number of pixels in the array which have the same value;

(c) entering each total of same-valued pixels determined in step (b) in a location of the first matrix which has a decimal address congruent to the decimal value;

(d) converting the total in each address of the first matrix into a binary number;

(e) generating a plurality of second matrices, each second matrix having addresses which respectively coincide with the pixel addresses in the array, there being one second matrix corresponding to each pixel value represented as an address in the first matrix;

(f) writing a binary "1" in each address of each second matrix when the pixel located at the coinciding address in the array has a value equal to the value to which the second matrix corresponds, and writing a binary "0" in all other addresses of the second matrices;

(g) linking each of the second matrices to the first matrix for data transmission by associating each individual second matrix with a corresponding address in the first matrix, the corresponding address of the first matrix being the same as the pixel value which corresponds to the individual second matrix; and (h) transmitting at least the second matrices.

2. A method as in claim 1, which further comprises: truncating the first matrix by deleting therefrom all binary "0" values following step (d).

3. A method as in claim 1, wherein:
the addresses in the array and in the first and second matrices are isomorphic with each other and with the range of pixel values.

4. A method as in claim 1, wherein:
the addresses in the first matrix and the range of pixel values are isomorphic.

5. A method as in claim 4, wherein:
the first matrix is square.

6. A method as in claim 5, wherein:
the pixel values P and the addresses A of the first matrix have a decimal range of O to N, each address A in the first matrix in which there is entered the total count of pixels having the same value P being given by $$A = P = R(M) + C,$$

where M is the number of addresses along a side of the first matrix, R is the row of the address in the first matrix and is the largest whole number by which M can be multiplied without exceeding P, C is the column of the address in the first matrix and is given by the difference $P - R(M)$, the decimal values of R and C range from 0 to $M-1$, and wherein step (c) is performed by determining A for each address of the array and counting the A's having the same value.

7. A method as in claim 6, wherein,
P, N and A range from 0 to 255,
R and C range from 0-15, and
M is 16.

8. A method as in claim 7, wherein:
a plurality of arrays constitute a frame, the data of the frame being compressed by serially compressing the data in each array thereof.

9. A method as in claim 8, wherein:
the frame is a 512 pixel 512 pixel grid made up of an 8 by 8 grid of blocks, each block being made up of a 4 by 4 grid of sub-blocks, each sub-block constituting an array.

10. A method as in claim 5, wherein a plurality of arrays together constitute a frame, the data representing the pixels of the frame being compressed by serially compressing the data in each array thereof.

11. A method as in claim 10, wherein:
the frame includes groups of arrays, the number of arrays in each group being equal to the number M of addresses along any side of the arrays.

* * * * *